May 12, 1925.
J. F. MANN
1,537,125
APPLIANCE FOR MUSICAL INSTRUCTION
Filed June 28, 1921
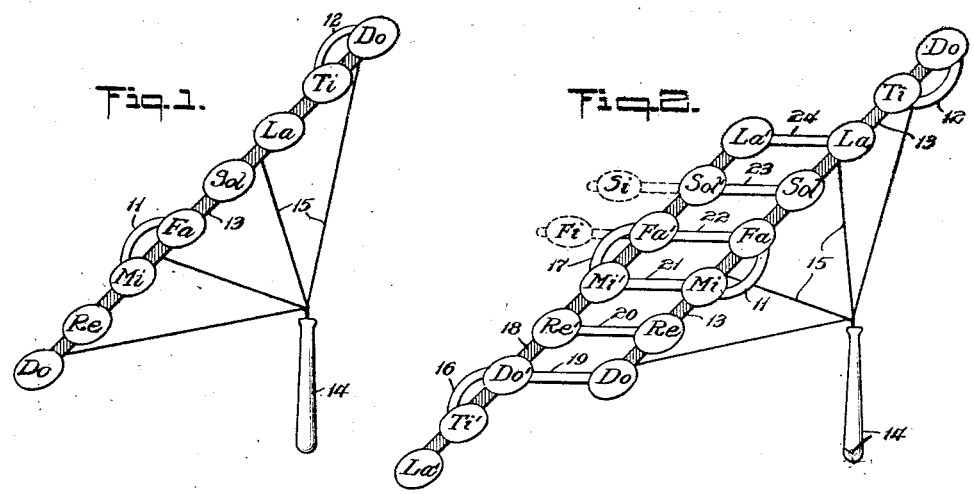
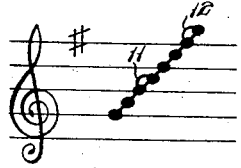
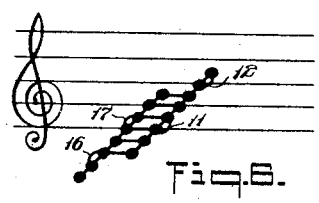
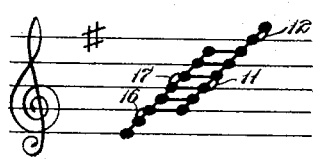
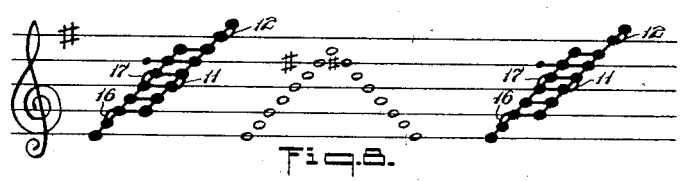
Inventor
Jessie F. Mann
By her Attorney Patented May 12, 1925.

1,537,125

UNITED STATES PATENT OFFICE.

JESSIE F. MANN, OF LONG LAKE, NEW YORK.

APPLIANCE FOR MUSICAL INSTRUCTION.

Application filed June 28, 1921. Serial No. 481,031.

*To all whom it may concern:*

Be it known that I, JESSIE F. MANN, a citizen of the United States, residing at Long Lake, in the county of Hamilton and the State of New York, have invented new and useful Appliances for Musical Instruction, of which the following is a specification.

My invention relates to an appliance for use in the teaching of music, more especially for class instruction, as, for example, in public schools.

The ordinary method of showing the development of key signatures, the relation of scales to their corresponding signatures, and the relationship between major and minor keys and scales has included the use of printed charts, and the use of notes written by the teacher on a staff drawn on the blackboard by the staff-marker. For pitch drills the teacher sometimes uses her hand, pointing to the fingers for certain notes, and to the spaces between, for other notes. These methods are time consuming, and are often confusing because of the numerous notes necessary for expressing one musical idea. They provide no concrete demonstration of the fact that all major scales, and that all minor scales, are exactly alike in form.

An object of my invention is to provide an appliance by means of which musical instruction may be rendered more facile, certain, and rapid.

Other objects of my invention are to provide such an appliance adapted for instruction in the development of key signatures, or the relation of scales to their corresponding signatures, or the interrelationship between the major scales and the minor scales (either natural, harmonic, or melodic), or for any, or for all, of the combinations of the same.

A further object of my invention is to provide an appliance which may be held in the hand for pitch drills, or placed in selected positions alongside the staff (traced on the board by the staff-marker) for scale, signature or transposition instruction.

In the accompanying drawings I have shown both a major scale and a combination device, and indicated various uses for each device. I desire, however, that both the drawings and the following explanation shall be considered as illustrating the invention rather than limiting it.

Fig. 1 illustrates one form of major scale device;

Fig. 2 illustrates a combination device for both major and minor scales;

Figs. 3 to 5 inclusive illustrate the location of the device of Fig. 1 as used in teaching the scales and signatures in the keys of C, G, and F major respectively;

Figs. 6 and 7 illustrate the location of the device of Fig. 2 in teaching the scales of A minor and E minor respectively; and Figs. 8 and 9 illustrate the location of the device of Fig. 2 in teaching the harmonic form of E minor, and the melodic form of E minor, respectively.

The major scale device, illustrated in Fig. 1, has a set of 8 elements (which I have found may be conveniently termed "syllable keys"), do, re, mi, fa, sol, la, ti, do, equally spaced. Each of these elements representing the corresponding tone in the scale. The elements mi and fa and the elements ti and do are joined together by bridging members 11 and 12 respectively. These foregoing parts constitute the operative part of the device. They may be mounted in any suitable manner, as, for example, on a bar 13, connected to a handle 14 by wires 15. The size of the device should be such that it may be used conveniently alongside the staff as traced by a staff marker.

In using this device for pitch drill it may be held in the left hand, and with the syllables toward the pupil, the teacher pointing to first one syllable key and then to another as the pupils sing. In this use the device is a substitute for the teacher's hand, but it is a great improvement, for the syllables are written on the syllable keys so that there can be no confusion, and the scale form is constantly before the children during the drill.

In teaching the scales and for scale practice, also in teaching the development of signatures, and transposition from key to key, the device may be held over the staff as drawn on the board by the staff-marker, as illustrated in Figs. 3 to 5 inclusive.

In Fig. 3 the device is shown in position for the C major scale. It will be apparent that do falls on the first added line below, which is "c," and which note names the scale. The bridging member 11 comes between the first line and the first space which correspond with "e" and "f" on the piano, and the bridging member 12 comes between the third line and the third space which correspond with "b" and "c" on the piano. These half steps are fixed. That is from "e" to "f" and from "b" to "c" is always a half step and likewise in every major scale there must be a half step between mi and fa and between ti and do.

In Fig. 4 the device is placed in position for the scale of G major. Do coming on "g," the second line, the half-step bridging member 11 coming between "b" and "c" where there is a half-step, and the bridging member 12 between "f" and "g" where there is a whole step. The whole step must come between la and ti and the half step between ti and do which is accomplished by placing a sharp (#) before the F. This gives the signature, 1 sharp, as indicated in the figure.

In Fig. 5 the device is placed in position for the scale of F major, do coming on "f", the first space on the staff, the half-step bridging member 11 coming between "a" and "b" and the bridging member 12 between "e" and "f". There is a whole step between "a" and "b" on the staff, but to bring the half step between the syllables mi and fa it is necessary to drop "b" one-half step. To do this a flat (♭) is placed before "b". This mark is shown in the signature of F major as illustrated in the figure.

In transposing from the C pitch pipe as from C to G major, while the pupils sing do (8) sol (5) in C the device is held as in Fig. 3, then as the pupils modulate (sol—o—do) to get do (1) in G major, the device is quickly changed to the position Fig. 4 and the pupils then sing intervals as do—mi—sol—mi—do to get into the tonality of G major. This plan can be followed for all transpositions and modulations.

In drilling for rapid sight-reading the device may be placed in any key position as, for example, in Fig. 4. Observe that do is on the second line and mi—sol—ti are on the third, fourth, and fifth lines respectively. Also observe that re—fa—la—do (8) are in the second, third and fourth spaces, and space above respectively. Further note that sol below is in a space (the second space below do (1)). When the position is changed as in Fig. 5 this order is reversed.

From these figures it is believed to be apparent that the device may be used in teaching all the major scales, also how the signatures of all these scales may be developed and how to transpose from one major key to another.

The minor scale device, illustrated in Fig. 2, has the same set of 8 elements, or "syllable keys," do, re, me, fa, sol, la, ti, do, with the bridging members 11 and 12, which were present in the major scale device, together with a second set of 8 elements, or "syllable keys," la′, ti′, do′, re′, mi′, fa′, sol′, la′, representing corresponding tones in the scale. It is also provided with bridging members 16 and 17 in the positions indicated. This device also has elements fi and si representing the notes fi and si; these elements being mounted so that they may be obscured by the elements fa′ and sol′, or in any convenient manner which permits their being out of sight when unnecessary. The elements la′, ti′, do′, re′, me′, fa′, sol′, la′, are mounted on a bar 18 and the elements do—do′, re—re′, mi—mi′, fa—fa′, sol—sol′, ti—ti′, are connected by bars 19 to 24 inclusive. The minor scale device may be a complete device, or, as is apparent, may be made by suitably fastening the additional parts onto the major scale device.

In teaching the minor scales, their signatures and transposition from key to key the combination device may be used in connection with the staff drawn by the staff-marker as previously described in explaining the use of the major scale device.

In Fig. 6 the device is shown in position for the A minor scale. la′ is on "a," the 2nd added line below; do′ is one "c," the first added line below; this makes C the relative major scale and both scales are shown in the device. The half steps come between "b" and "c" and between "e" and "f," therefore there are no sharps or flats in the signature.

In Fig. 7 the device is shown in position for the E minor scale. la′ is on "e," do′ is on "g," G is the relative major scale, the half-steps come between "f" and "g" and between "b" and "c". This necessitates a sharp (#) before "f" as explained in connection with Fig. 4 for the G major scale, thus making 1 sharp the signature for the E minor scale.

All other minor scales may be developed by using the device in the same manner, placing la′ on the first note of the desired scale. All similar points between the major and the minor scales are graphically illustrated, also all differences are easily discovered when this device is used in connection with a music staff.

In Fig. 8 the combination device is shown in position for the E minor scale, but with the movable si element showing as required for the harmonic minor scale. This raises sol (in this case "d") one-half step. To do this a sharp is placed before that note in the scale. This sharp is called an accidental and is not used in the signature.

In Fig. 9 the combination device is again shown in position for E minor, but this time both the movable elements fi and si are shown in the ascending scale, causing sharps to be placed before both "c" and "d"; while in the descending scale the movable elements fi and si are withdrawn to their place of concealment behind fa′ and sol′, causing natural signs (♮) to be placed before "d" and "c". This is the melodic minor scale, having the sixth and seventh tones raised ascending, and lowered to their natural position descending.

These devices can be used in numerous ways for teaching or illustrating music theory and practice. It is obvious from these illustrations that the devices herein described can be used in an exceedingly large number of ways for teaching music theory and practice. In fact there are no points to be covered in keys, scales, or signatures, which cannot be made more clear by use of the device.

What I claim is:

1. A unitary appliance for musical instruction, comprising a frame having representations of the tones of a major musical scale positioned thereon to show their position on a staff, and means for supporting said frame whereby the same may be superimposed upon or removed from a staff.

2. A unitary appliance for musical instruction, comprising a frame having representations of the tones of a minor musical scale positioned thereon to show their position on a staff, and means for supporting said frame whereby the same may be superimposed upon or removed from a staff.

3. A unitary appliance for musical instruction, comprising a frame having representations of the tones of a harmonic minor scale positioned thereon to show their position on a staff, and means for supporting said frame whereby the same may be superimposed upon or removed from a staff.

4. A unitary appliance for musical instruction, comprising a frame having representations of the tones of a melodic minor scale positioned thereon to show their position on a staff, and means for supporting said frame whereby the same may be superimposed upon or removed from a staff.

5. A unitary appliance for musical instruction, comprising a frame having representations of the tones of a major musical scale positioned thereon to show their position on a staff, certain of said tone representations being joined together by elements which represent the location of half-steps in said musical scale, and means for supporting said frame whereby the same may be superimposed upon or removed from a staff.

6. A unitary appliance for musical instruction, comprising a frame having representations of the tones of a minor musical scale positioned thereon to show their position on a staff, certain of said tone representations being joined together by elements which represent the location of half-steps in said musical scale, and means for supporting said frame whereby the same may be superimposed upon or removed from a staff.

7. A unitary appliance for musical instruction, comprising a frame having representations of the tones of a major musical scale and a minor musical scale positioned thereon to show their position on a staff, and means for supporting said frame whereby the same may be superimposed upon or removed from a staff.

8. A unitary appliance for musical instruction, comprising a frame having representations of the tones of a major musical scale and a minor musical scale positioned thereon to show their position on a staff, certain of said tone representations being joined together by elements which represent the location of half-steps in one of said musical scales, and means for supporting said frame whereby the same may be superimposed upon or removed from a staff.

9. A unitary appliance for musical instruction, comprising a frame having representations of the tones of a major musical scale and a minor musical scale positioned thereon to show their position on a staff, certain of said tone representations being joined together by elements which represent the location of half-steps in both of said musical scales, and means for supporting said frame whereby the same may be superimposed upon or removed from a staff.

10. A unitary appliance for musical instruction, comprising a frame having representations of the tones of a natural minor scale positioned thereon to show their position on a staff, certain of said tone representations being associated with movably mounted elements adjustable into either of two positions, in one position representing the raised step si of the harmonic minor scale one-half step higher than sol in the natural minor scale, and in the other position being concealed by the element sol, and means for supporting said frame whereby the same may be superimposed upon or removed from a staff.

11. A unitary appliance for musical instruction, comprising a frame having representations of the tones of a natural minor scale positioned thereon to show their position on a staff, and a representation for the tone of the raised step si of the harmonic minor scale one-half step higher than sol in the natural minor scale, and means for supporting said frame whereby the same may be superimposed upon or removed from a staff.

12. A unitary appliance for musical instruction, comprising a frame having representations of the tones of a natural minor scale positioned thereon to show their position on a staff, certain of said tone representations being associated with movably mounted elements adjustable into either of two positions, in one position representing the raised sixth and seventh tones fi and si of the ascending melodic minor scale, and in the other position being concealed by the elements representing fa and sol of the descending melodic minor scale, and means for supporting said frame whereby the same may be superimposed upon or removed from a staff.

13. A unitary appliance for musical instruction, comprising a frame having representations of the tones of a major musical scale positioned thereon to show their position on a staff and to show pitch independently of said staff, and a handle for supporting said frame whereby the same may be superimposed upon or removed from a staff or held in the hand for pitch drills.

14. A unitary appliance for musical instruction, comprising a frame having representations of the tones of a minor musical scale positioned thereon to show their position on a staff and to show pitch independently of said staff, and a handle for supporting said frame whereby the same may be superimposed upon or removed from a staff or held in the hand for pitch drills.

15. A unitary appliance for musical instruction, comprising a frame having representations of the tones of a major musical scale positioned thereon to show their position on a staff and to show pitch independently of said staff, certain of these elements being joined together to represent the location of half steps in said musical scale, and a handle for supporting said frame whereby the same may be superimposed upon or removed from a staff or held in the hand for pitch drills.

16. A unitary appliance for musical instruction, comprising a frame having representations of the tones of a minor musical scale positioned thereon to show their position on a staff and to show pitch independently of said staff, certain of these elements being joined together to represent the location of half steps in said musical scale, and a handle for supporting said frame whereby the same may be superimposed upon or removed from a staff or held in the hand for pitch drills.

17. A unitary appliance for musical instruction, comprising a frame having representations of the tones of a major musical scale and the tones of a minor musical scale positioned thereon to show their position on a staff and to show pitch independently of said staff, and a handle for supporting said frame whereby the same may be superimposed upon or removed from a staff or held in the hand for pitch drills.

18. A unitary appliance for musical instruction, comprising a frame having representations of the tones of a major musical scale and the tones of a minor musical scale positioned thereon to show their position on a staff and to show pitch independently of said staff, certain of these elements being joined together by elements which represent the location of half-steps in one of said musical scales, and a handle for supporting said frame whereby the same may be superimposed upon or removed from a staff or held in the hand for pitch drills.

19. A unitary appliance for musical instruction, comprising a frame having representations of the tones of a natural minor scale positioned thereon to show their position on a staff and to show pitch independently of said staff, certain of said tone representations being associated with movably mounted elements adjustable into either of two positions, in one position representing the raised sixth and seventh tones fi and si of the ascending melodic minor scale, and in the other position being concealed by the elements representing fa and sol of the descending melodic minor scale, and a handle for supporting said frame whereby the same may be superimposed upon or removed from a staff or held in the hand for pitch drills.

20. A unitary appliance for musical instruction, comprising a frame having representations of the tones of a major musical scale positioned thereon to show their position on a staff and to show pitch independently of said staff and being marked with syllable names, and a handle for supporting said frame whereby the same may be superimposed upon or removed from a staff or held in the hand for pitch drills.

21. A unitary appliance for musical instruction, comprising a frame having representations of the tones of a minor musical scale positioned thereon to show their position on a staff and to show pitch independently of said staff and being marked with syllable names, and a handle for supporting said frame whereby the same may be superimposed upon or removed from a staff or held in the hand for pitch drills.

22. A unitary appliance for musical instruction, comprising a frame having representations of the tones of a major musical scale and of a minor musical scale positioned thereon to show their position on a staff and to show pitch independently of said staff and being marked with syllable names, and a handle for supporting said frame whereby the same may be superimposed upon or removed from a staff or held in the hand for pitch drills.

23. A unitary appliance for musical instruction, comprising a frame having representations of the tones of a natural minor scale positioned thereon to show their position on a staff and to show pitch independently of said staff and being marked with syllable names, certain of said tone representations being associated with movably mounted elements adjustable into either of two positions, in one position representing the raised sixth and seventh tones fi and si of the ascending melodic minor scale, and in the other position being concealed by the elements representing fa and sol of the descending melodic minor scale, and a handle for supporting said frame whereby the same may be superimposed upon or removed from a staff or held in the hand for pitch drills.

JESSIE F. MANN.